United States Patent
Spatafora et al.

(10) Patent No.: US 6,903,315 B2
(45) Date of Patent: Jun. 7, 2005

(54) METHOD AND UNIT FOR WRAPPING AN ARTICLE IN A SHEET OF THERMOPLASTIC WRAPPING MATERIAL

(75) Inventors: Mario Spatafora, Bologna (IT); Bruno Tommasini, Pianoro (IT)

(73) Assignee: G. D Societa' per Azioni, Bologna (IT)

(*) Notice: Subject to any disclaimer, the term of this patent is extended or adjusted under 35 U.S.C. 154(b) by 0 days.

(21) Appl. No.: 10/474,401

(22) PCT Filed: Apr. 17, 2002

(86) PCT No.: PCT/IT02/00241
§ 371 (c)(1),
(2), (4) Date: Apr. 2, 2004

(87) PCT Pub. No.: WO02/084241
PCT Pub. Date: Oct. 24, 2002

(65) Prior Publication Data
US 2004/0155033 A1 Aug. 12, 2004

(30) Foreign Application Priority Data
Apr. 17, 2001 (IT) .................................. BO2001A0224

(51) Int. Cl.[7] .......................... H05B 6/06; G01K 13/06
(52) U.S. Cl. .................... 219/633; 219/663; 219/667; 219/653; 53/463; 53/557; 156/272.4; 156/379.6
(58) Field of Search ............................. 219/633, 663, 219/665, 667, 653–658; 53/463, 557, 370.7, 373.8; 156/272.4, 274.2, 379.6, 380.2

(56) References Cited

U.S. PATENT DOCUMENTS

| | | | |
|---|---|---|---|
| 2,989,691 A | 6/1961 | Cook | 324/34 |
| 3,883,386 A | * 5/1975 | Garbini et al. | 156/498 |
| 4,317,979 A | * 3/1982 | Frank et al. | 219/665 |
| 4,474,825 A | 10/1984 | Schmidt | 427/10 |
| 4,668,851 A | 5/1987 | Küpper | 219/10.77 |

FOREIGN PATENT DOCUMENTS

| | | |
|---|---|---|
| DE | 16 48 200 A | 5/1971 |
| FR | 2 665 535 A | 2/1992 |

* cited by examiner

*Primary Examiner*—Philip H. Leung
(74) *Attorney, Agent, or Firm*—Ladas & Parry LLP

(57) ABSTRACT

In a method for wrapping an article in a sheet of thermoplastic wrapping material, the temperature of an at least partly metal belt (5) looped and induction heated to seal wrapping material (4) is detected by detecting a first signal (S1) to the voltage (V) applied to the belt (5), and a second signal (S2) related to the current (I) circulating along the belt (5); and by calculating the electric resistance (R) of the belt (5) as a function of the first and second signal (S1, S2); the electric resistance (R) of the belt (5) being related to the temperature (T) of the belt (5).

13 Claims, 1 Drawing Sheet

METHOD AND UNIT FOR WRAPPING AN ARTICLE IN A SHEET OF THERMOPLASTIC WRAPPING MATERIAL

TECHNICAL FIELD

The present invention relates to a method for wrapping an article in a sheet of thermoplastic wrapping material.

BACKGROUND ART

Some packing machines are equipped with at least partly metal belts, which are heated by electromagnetic induction to seal wrapping material. On machines of this sort, each belt forms part of a sealing unit, which, in addition to the belt looped about two pulleys, comprises a device for detecting and controlling the temperature of the belt.

The belt is fed along a given path and defines a work branch along which it is brought into contact with a sheet of thermoplastic wrapping material, wrapped about an article, to melt a portion of the wrapping material and seal the sheet of wrapping material about the article.

The temperature detecting and control device comprises a ferromagnetic core connected to the belt and to a primary supply circuit to induce a current in, and heat, the belt by induction; and a sensor for detecting the temperature of the belt. The detected temperature is used to control the supply circuit and keep the temperature of the belt around a set value during operation of the packing machine.

Since the belt travels continuously at high speed, the temperature detecting sensors are noncontacting types, normally pyrometers or infrared thermocouples, which have the disadvantage of being not only expensive but also fairly inaccurate. Such sensors, in fact, are based on spectral analysis of the emission of the belt, which changes color uncontrollably during use, thus affecting emission and impairing the accuracy of the temperature measurement.

DISCLOSURE OF INVENTION

It is an object of the present invention to provide a method for wrapping an article in a sheet of thermoplastic wrapping material, designed to eliminate the drawbacks of the known state of the art, and which in particular provides for accurate temperature measurement at low cost.

According to the present invention, there is provided a method for wrapping an article in a sheet of thermoplastic wrapping material as recited by claim 1.

The present invention also relates to a sealing unit.

According to the present invention, there is provided a unit for wrapping an article in a sheet of thermoplastic wrapping material as recited by claim 10.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
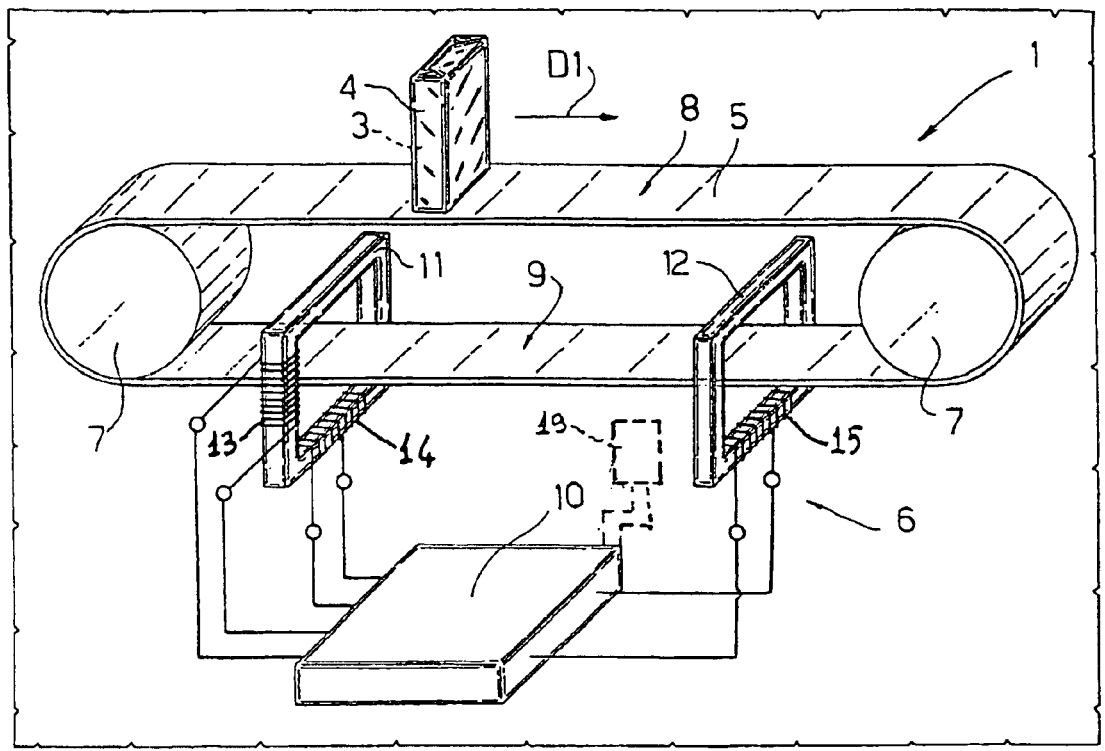
FIG. 1 shows, with parts removed for clarity, a sealing unit implementing the method according to the present invention.

Number 1 in FIG. 1 indicates as a whole a sealing unit of a packing machine 2 for wrapping articles 3 in sheets 4 of thermoplastic wrapping material. Sealing unit 1 comprises an at least partly metal belt 5, and a device 6 for detecting and controlling the temperature T of belt 5.

Belt 5 is looped about two pulleys 7 to form a work branch 8, along which belt 5 is brought into contact with adjacent portions (not shown) of a sheet 4 of wrapping material wrapped about an article 3 and is fed together with article 3 in a direction D1 to melt and join said adjacent portions (not shown) of sheet 4 of wrapping material, and a return branch 9, along which belt 5 is connected to device 6 for detecting and controlling temperature T.

Device 6 comprises a processing unit 10; and two ferromagnetic cores 11 and 12 looped about belt 5. Core 11 is connected to an electric winding 13 (primary) and to a detecting electric winding 14 (secondary); core 12 is connected to a detecting electric winding 15 (secondary); and electric windings 13, 14 and 15 are connected to processing unit 10, which receives a voltage V1 signal S1 from electric winding 14 and a voltage V2 signal S2 from electric winding 15, and processes a signal S3 relative to the supply voltage V3 of electric winding 13.

Figure 2:
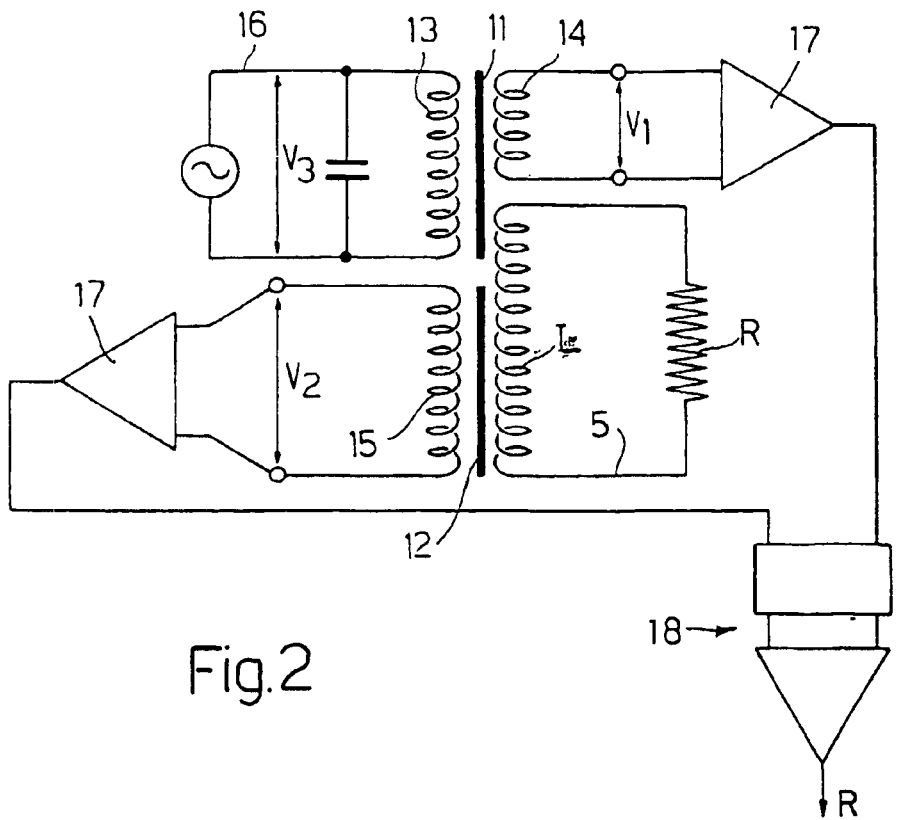
FIG. 2 shows, with parts removed for clarity, an electric diagram of the FIG. 1 unit.

With reference to FIG. 2, belt 5 is shown schematically in the form of an electric circuit comprising an electric inductance L and an electric resistance R; and cores 11 and 12 and electric windings 13, 14 and 15 are shown schematically by conventional electric symbols and indicated using the same reference numbers as in FIG. 1.

Electric winding 13 forms part of an LC resonant circuit 16 at a frequency ranging between a few tens and a few hundred kHz. Voltage V1 signal S1 is picked up from electric winding 14 and is related to supply voltage V3 and to the voltage V applied to belt 5; and voltage V2 signal S2 is picked up from electric winding 15 and is related to the current I circulating in belt 5. In other words, the voltage V applied to belt 5 depends solely on the supply voltage V3 of electric winding 13 and is proportional to the voltage V1 generated in electric winding 14; while the current I circulating in belt 5 is related to the supply voltage V3 of electric winding 13 and to the electric resistance R of belt 5 and is proportional to the voltage V2 generated in electric winding 15.

In a further embodiment not shown, circuit 16 may comprise an alternating-current generator, which obtains the same mutual inductance effects as the LC resonant circuit.

Processing unit 10 comprises two amplifiers 17 for amplifying voltages V1 and V2; and a processing stage 18 for processing voltages V1 and V2.

Voltages V1 and V2 are processed by stage 18 to determine the resistance R of belt 5 by means of Ohm's law R=V/I, in that V is related to V1 and I is related to V2, and by correction coefficients determined experimentally.

In an embodiment not shown, voltages V1 and V2 are converted from alternating to direct current by electronic true RMS to DC converter circuits to simplify processing of voltages V1 and V2.

Once the electric resistance R of belt 5 is known, the temperature T of belt 5 is calculated by multiplying resistance R by a constant, and is added to a predetermined (offset) value, in that the variation in electric resistance R is related to temperature T by a linear equation. The method described, in fact, is based on the principle that the metal (ferrous) material used at least partly in the making of belt 5 varies linearly in electric resistance R alongside a variation in temperature T, at least within the 15° C. to 250° C. temperature range used in the sealing operations on packing machine 2. Within the above range, in fact, the temperature T of belt 5 and the electric resistance R of belt 5 are related by a linear function.

In other words, each sheet 4 of thermoplastic wrapping material is folded around the relevant article 3 in order to overlap at least two portions of the sheet 4; thus, the two overlapped portions are sealed by bringing the overlapped portions into contact with the belt 5. The temperature T of the belt 5 is continuously detected for controlling the electric current I induced in the belt 5 in order to keep the temperature T inside a given range. For detecting the temperature T of the belt 5 it is determined the characteristic function, which relates the electric resistance R of the belt 5 to the temperature T of the belt 5, it is detected the first signal S1, S3 related to the voltage V applied to the belt 5, and the second signal S2 related to the current I circulating in the belt 5, it is calculated the electric resistance R of the belt 5 as a function of the first signal S1, S3 and the second signal S2, and it is detected the temperature T of the belt 5 using the characteristic function, which relates the electric resistance R of the belt 5 to the temperature T of the belt 5.

On receiving the temperature T value, processing unit 10 compares it with a set value (setpoint) to vary in known manner the supply voltage V3 of primary electric winding 13.

Unit 10 may display the currently detected temperature value T.

In a variation not shown, electric winding 14 (primary) is replaced by an instrument for detecting the voltage V3 applied to electric winding 13. In other words, voltage V1 signal S1 is replaced by supply voltage V3 signal S3 related to the voltage V applied to belt 5.

In a further embodiment, as shown by the dash line in FIG. 1, the current I circulating in belt 5 may be detected directly by means of a Hall-effect sensor 19 connected to processing unit 10. Using Hall-effect sensor 19, signal S1 is a current, so there is no need to determine the voltage V2 in electric winding 15 connected to ferromagnetic core 12.

What is claimed is:

1. A method for wrapping an article (3) in a sheet (4) of thermoplastic wrapping material; the method comprising:
   folding the sheet (4) around the article (3) in order to overlap at least two portions of the sheet (4);
   sealing said two overlapped portions by bringing the overlapped portions into contact with an at least partly metal belt (5) looped, which is heated by an electric current (I) induced by a first electric winding (13) coupled to said belt (5);
   detecting a temperature (T) of the belt (5); and
   controlling the electric current (I) induced in the belt (5) in order to keep the temperature (T) inside a given range;
   method being characterized by:
   determining a characteristic function, which relates the electric resistance (R) of the belt (5) to the temperature (T) of the belt (5);
   detecting a first signal (S1, S3) related to the voltage (V) applied to the belt (5), and a second signal (S2) related to the current (I) circulating in the belt (5);
   calculating the electric resistance (R) of the belt (5) as a function of the first signal (S1, S3) and the second signal (S2); and
   detecting the temperature (T) of the belt (5) using the characteristic function, which relates the electric resistance (R) of the belt (5) to the temperature (T) of the belt (5).

2. A method as claimed in claim 1, wherein said current (I) circulating in the at least partly metal belt (5) is induced by means of a first ferromagnetic core (11), surrounding said belt (5) and connected to said first electric winding (13), by virtue of a supply voltage (V3).

3. A method as claimed in claim 2, wherein said first signal (S1) is the supply voltage (V3) of the first electric winding (13).

4. A method as claimed in claim 2, wherein said first ferromagnetic core (11) is connected to a second electric winding (14); said first signal (S1) being a voltage (V1) at the terminals of the second electric winding (14), and being related to the supply voltage (V3) of the first electric winding (13).

5. A method as claimed in claim 2, wherein said second signal (S2) is detected by means of a second ferromagnetic core (12) surrounding said belt (5), and a third electric winding (15) connected to the second ferromagnetic core (12); said second signal (S2) being a voltage (V2) at the terminals of the third electric winding (15).

6. A method as claimed in claim 2, wherein said second signal (S2) is detected by means of a Hall-effect sensor (19); the sensor (19) detecting the current (I) in the belt (5).

7. A method as claimed in claim 1, wherein said first winding (13) forms part of a resonant circuit (16).

8. A method as claimed in claim 7, wherein the supply voltage (V3) of the first electric winding (13) is varied by means of said resonant circuit (16) as a function of the temperature (T) of said belt (5).

9. A method as claimed in claim 1, wherein said at least partly metal belt (5) is made at least partly of ferrous material, so that, within the 15 C. to 250 C. temperature (T) range, the temperature (T) and the electric resistance (R) of said belt (5) are related by a linear function.

10. A unit for wrapping an article (3) in a sheet (4) of thermoplastic wrapping material; the unit comprising: folding means for folding the sheet (4) around the article (3) in order to overlap at least two portions of the sheet (4); sealing means (1) for sealing said two overlapped portions, the sealing means (1) comprising an at least partly metal belt (5) looped, which is heated by an electric current (I) induced by a first electric winding (13) coupled to said belt (5) and is brought into contact with the overlapped portions; detecting means (6) for detecting a temperature (T) of the belt (5); and control means (6) for controlling the electric current (I) induced in the belt (5) in order to keep the temperature (T) inside a given range; the unit being characterized by comprising memory means (6) for storing a characteristic function, which relates the electric resistance (R) of the belt (5) to the temperature (T) of the belt (5), and sensing means (10) for detecting a first signal (S1, S3) related to the voltage (V) applied to the belt (5), and a second signal (S2) related to the current (I) circulating in the belt (5); said detecting means (6) being able to calculate the electric resistance (R) of the belt (5) as a function of the first signal (S1, S3) and the second signal (S2), and to detect the temperature (T) of the belt (5) using the characteristic function, which relates the electric resistance (R) of the belt (5) to the temperature (T) of the belt (5).

11. A unit as claimed in claim 10, wherein the belt (5) defines a work branch (8) along which said belt (5) is brought into contact with the wrapping material (4), and a return branch (9) along which the belt (5) is coupled to the control and detecting devices (6).

12. A unit as claimed in claim 11, wherein the control and detecting devices (6) comprise at least one ferromagnetic core (11; 12) connected to a relative winding (14; 15) on which said device (6) detects relative voltage signals (S1; S2).

13. A unit as claimed in claim 10, and implementing the method for wrapping an article (3) in a sheet (4) of thermoplastic wrapping material;

the method comprising:

folding the sheet (4) around the article (3) in order to overlap at least two portions of the sheet (4);

sealing said two overlapped portions by bringing the overlapped portions into contact with an at least partly metal belt (5) looped, which is heated by an electric current (I) induced by a first electric winding (13) coupled to said belt (5);

detecting a temperature (T) of the belt (5); and controlling the electric current (I) induced in the belt (5) in order to keep the temperature (T) inside a given range;

the method being characterized by:

determining a characteristic function, which relates the electric resistance (R) of the belt (5) to the temperature (T) of the belt (5);

detecting a first signal (S1, S3) related to the voltage (V) applied to the belt (5), and a second signal (S2) related to the current (I) circulating in the belt (5);

calculating the electric resistance (R) of the belt (5) as a function of the first signal (S1, S3) and the second signal (S2); and detecting the temperature (T) of the belt (5) using the characteristic function, which relates the electric resistance (R) of the belt (5) to the temperature (T) of the belt (5).

* * * * *